United States Patent [19]

Ruiz

[11] Patent Number: 4,813,569
[45] Date of Patent: Mar. 21, 1989

[54] PRESSURE TEST CAP FOR PLUMBING DRAIN PIPES

[76] Inventor: Louie P. Ruiz, 3934 Tennyson St., San Diego, Calif. 92107

[21] Appl. No.: 167,580

[22] Filed: Mar. 14, 1988

[51] Int. Cl.⁴ .............................................. B65D 51/18
[52] U.S. Cl. ....................................... 220/254; 138/89
[58] Field of Search ................... 220/254, 288; 138/89, 138/96 T

[56] References Cited

U.S. PATENT DOCUMENTS

| | | | |
|---|---|---|---|
| 1,755,168 | 4/1930 | Carvalho . | |
| 2,993,616 | 7/1961 | Carlile, Jr. et al. | 220/24.5 |
| 3,065,767 | 11/1962 | Topf | 138/89 |
| 3,086,679 | 4/1963 | Bijroet | 220/254 |
| 3,713,463 | 1/1973 | Bywater, Jr. | 138/89 |
| 4,122,964 | 10/1978 | Morris | 215/260 |
| 4,342,337 | 8/1982 | Underwood | 138/96 T |
| 4,602,504 | 7/1986 | Barber | 73/49.8 |
| 4,643,825 | 2/1987 | Weslowski | 220/254 |
| 4,682,704 | 7/1987 | Kessler et al. | 215/329 |

Primary Examiner—George T. Hall
Attorney, Agent, or Firm—Calif Kip Tervo

[57] ABSTRACT

A method of sealing an open end of a plumbing drain pipe for leak testing the pipe comprises the steps of terminating the drain pipe in an open externally threaded end; and attaching a screw cap to the externally threaded end portion. The screw cap comprises a body including a cylindrical portion having internal threads for attachment to the externally threaded end portion of the drain pipe; and an end wall enclosing one end of the cylindrical portion and defining, with the cylindrical portion, a cavity. The end wall has a generally planar internal surface. A thick circular sealing disk, disposed within the cavity, has a diameter sufficient to cover the open end face of an attached pipe. An anti-friction washer is disposed between the sealing disk and the internal surface of the end wall which allows the sealing disk can rotate independently of the body; such that, as the body is threaded onto a pipe, the sealing disk does not rotate after encountering the pipe's open end face. A threaded plug in the end wall allows attachment of a hose. Preferably, the drain pipe is terminated by attaching a common trap adapter.

10 Claims, 1 Drawing Sheet

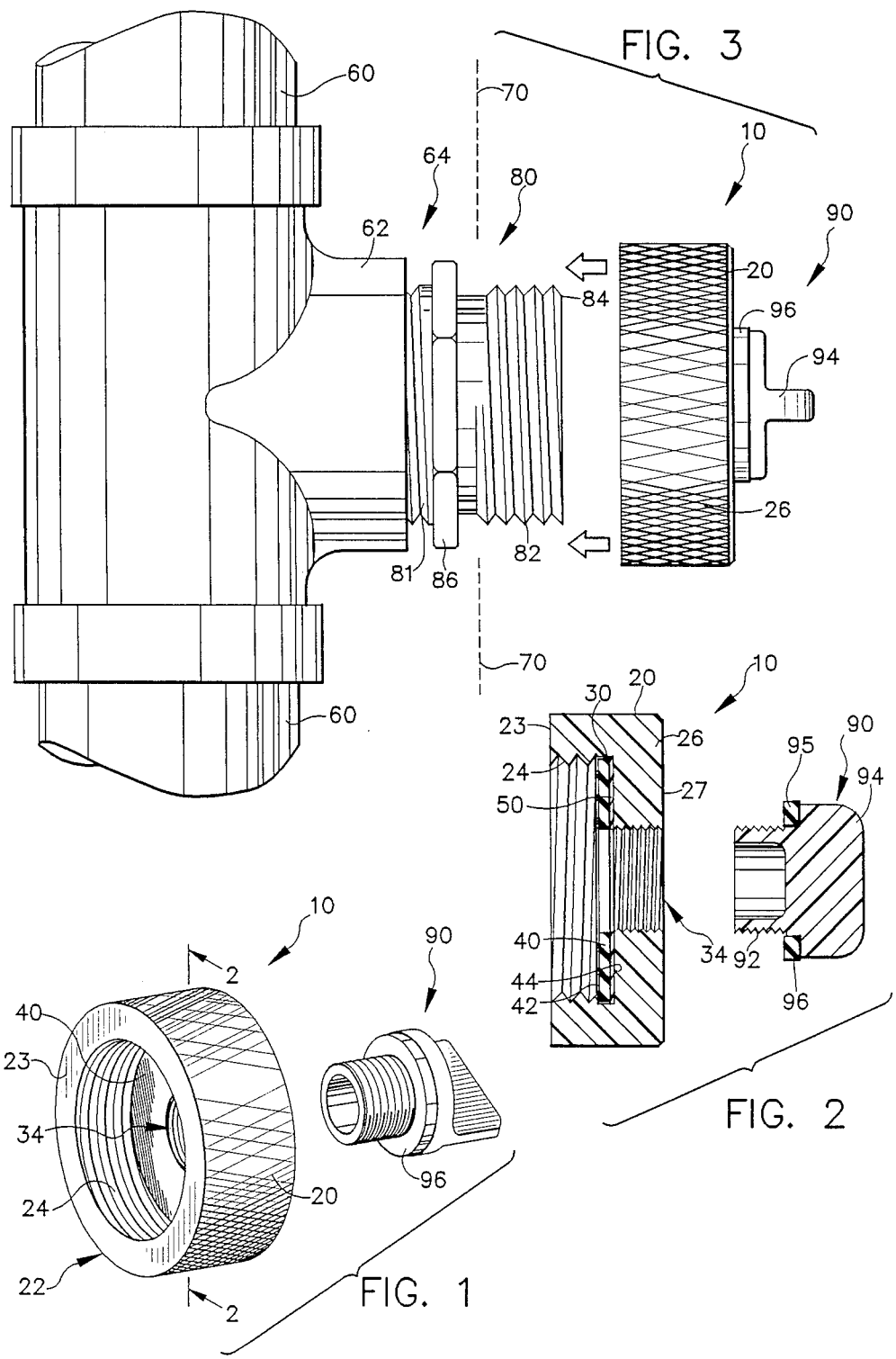

PRESSURE TEST CAP FOR PLUMBING DRAIN PIPES

BACKGROUND OF THE INVENTION

1. Field of the Invention

This invention relates in general to a method of plumbing installation during rough construction which allows all of the in-wall plumbing to be installed during rough and more specifically involves a cap for sealing the open ends of trap adapters and other externally threaded pipes to conduct the pressure test and to protect the threads.

2. Description of the Related Art

During the rough construction of a building, such as an apartment building, the main plumbing lines are installed within the framework before the wall covering boards are attached. In this manner, the plumbing systems can be immediately tested for visible leaks which can then be repaired before the pipe connections are hidden from view by the wall covering boards.

In the drain system, typically, vertical pipes made of two-inch diameter cast iron are disposed in the framework. These pipes are placed end-to-end and are joined with a coupling band. The coupling band is tightened with a hose clamp.

T-shaped side connections (tap-T's) are installed at intersections in the cast iron pipes for the connection of sinks or the like. In an apartment building or similar structure, there may be hundreds of tap-T's. The tap-T outlet to the sink is internally threaded with pipe threads. For pressure test, all of these tap-T's openings must be sealed. A head typically of ten feet of water is applied to the pipes, usually by filling the vertical drain pipe at a high location with water from a hose. The system is then visually inspected for leaks, and, if required, is repaired and is tested again.

Conventionally, several methods are used to seal the tap-T's for test. A common method involves the use of "test nipples". Test nipples are iron pipes, typically of six or twelve inches in length. One end is permanently capped, such as with a pipe cap with sealant on the threads. The open end, externally threaded with pipe threads, is connected to the open end of the tap-T. A sealant, such as teflon tape or pipe dope, must be used to seal the threads and prevent leaks. Large pipe wrenches are required to attach the test nipples to assure no leaks around the threads. After test, the test nipples are removed, which again requires the use of large pipe wrenches.

One disadvantage of the test nipple approach is that a large number of heavy, iron nipples must be moved around. Another disadvantage is that the persons making the rough installation and test must have and must carry large pipe wrenches and pipe thread sealant which they otherwise would not.

In another method, an extension pipe or a trap adapter is attached to the tap-T, and an expansion plug, commonly called a "dollar plug" is inserted in the end of the pipe. The dollar plug seals against the inside surface of the pipe. An expansion plug of this type is disclosed in U.S. Pat. No. 2,993,616 of W. A. Carlile, Jr. et al titled "Expansible Closure". There are a number of disadvantages to the use of expansion plugs. Often, they are expelled from the pipe under pressure test. This is sometimes caused by expansion of the pipe after the plug is installed. To prevent expulsion of dollar plugs, persons installing the plugs often resort to tying the plugs in place with wire over the end of the pipe. Of course, this is labor consuming. Another disadvantage of dollar plugs is that they provide no protection for the external threads of the trap adapter during further construction.

SUMMARY OF THE INVENTION

According to the invention a method of sealing an open end of a plumbing drain pipe for leak testing the pipe comprising the steps of terminating the drain pipe in an open externally threaded end; and attaching a screw cap to the externally threaded end portion. The screw cap comprises a body including a cylindrical portion having internal threads for attachment to the externally threaded end portion of the drain pipe; and an end wall enclosing one end of the cylindrical portion and defining, with the cylindrical portion, a cavity. The end wall has a generally planar internal surface. A thick circular sealing disk disposed within the cavity and has a diameter sufficient to cover the open end face of an attached pipe. An anti-friction washer is disposed between the sealing disk and the internal surface of the end wall; such that the sealing disk can rotate independently of the body. Thus, as the body is threaded onto a pipe, the sealing disk does not rotate after encountering the pipe's open end face, but will form a tight seal over the end face.

An exemplary embodiment of the test cap includes a threaded removable plug thru the body end wall. The plug serves as a means for injecting water into the pipes for testing or as a means for draining the pipes.

In the preferred method, the drain pipe is terminated in a common trap adapter to which the test cap is attached. Other features and many attendant advantages of the invention will become more apparent upon a reading of the following detailed description together with the drawings in which like reference numerals refer to like parts throughout.

The drawing disclose by way of example, and not by way of limitation, the principles of the invention and the structural implementation of the inventive concept.

BRIEF DESCRIPTION OF THE DRAWING

FIG. 1 is a partially exploded perspective view of a preferred embodiment of the pressure test cap of the present invention.

FIG. 2 is a cross-sectional view taken on line 2—2 of the cap of FIG. 1.

FIG. 3 is a side elevation view of the cap of FIG. 1 in position for attachment to a trap adapter.

DETAILED DESCRIPTION OF THE INVENTION

With reference now to the drawing, and more particularly to FIG. 1 thereof, there is shown a partially exploded perspective view of a preferred embodiment of the pressure test cap, denoted generally as 10, of the present invention.

Test cap 10 has a body 20 including a generally cylindrical portion 22 having internal threads 24 for attachment to external threads on a pipe, and an end wall 26 enclosing one end of cylindrical portion 22 to define attachment cavity 30. Cylindrical portion 22 has a longitudinal axis which is co-linear with that of the pipe to which it is to be attached. Cap body 20 may be made of any suitable material, however it is preferably made of tough, resilient plastic, such as Schedule 80 PVC (polyvinylchloride). It has been found that threads of this material exhibit the highly desirable strength and friction properties that permit cap 10 to be repeatedly hand threaded on pipe threads, hand tightened until sealed, and, after a passage of time, be removed by hand. Preferably, the cylindrical portion outer surface 25 is knurled to provide better grip for a user.

Thick circular sealing disk 40 is disposed in attachment cavity 40. A sealing disk thickness of one-eighth inch has been found to be adequate.

In a preferred embodiment, end wall 26 includes a threaded bore, denoted generally as 34. Threaded bore 34 is used to attach a water source, such as a water hose, for filling the plumbing system to be tested with water thru the test cap 10. It can also be used as a drain means for draining water from the system above this point. Sealing disk 40 and anti-friction washer 50 have a corresponding bore to allow for passage of the water. A plug, denoted generally as 90, for threaded bore 34 includes plug sealing washer 96. Plug 90 is best seen in FIG. 2. Plug 90 includes threaded portion 92 for engagement with threaded bore 34 and torsion application means, such as thumb nob 94, for screwing the plug in and out. For purposes of test, a hand-tightenable plug has been found to be adequate. Of course, other torsion application means, such as a hex head, could be used. Preferrebly, plug 90 is made of a strong, slightly resilient plastic material, such as Schedule 80 PVC. Plug sealing washer 96 seals against the outer face 27 of end wall 26 and against the overhanging lip, flange 95, of plug 90. Therefore, these surfaces should be appropriately smooth. Plug sealing washer 95 is made of any suitable material, such as rubber.

Turning now to FIG. 2, there is shown a cross-sectional view of the cap 10 of FIG. 1 taken on line 2—2. Sealing disk 40, having front surface 42 and rear surface 44, has a diameter substantially equal to that of internal threads 24. The internal surface 28 of end wall 26 is generally planar. Anti-friction washer 50 is disposed between sealing disk 40 and end-wall internal surface 28. In the preferred embodiment, anti-friction washer 50 is made of high density PVC with a thickness of one-sixteenth inch. The sides are smooth and shiny.

Preferably, a retaining means, such as race 32, retains sealing disk 40 and anti-friction washer 50 near the end of attachment cavity 30. In the preferred embodiment, race 32 is larger in diameter than internal threads 24 and the diameter sealing disk 40 lies between these two. Thus, the internal threads 24 retain disk 40, and consequently washer 50, in race 32.

Sealing disk 40 is of thick, pliable, yet water-impervious, material, such as neoprene. The thickness of sealing disk 40 must compensate for non-rightness in the end face angle of an attached pipe and for any roughness and irregularities thereon. In Applicant's experience, a thickness of one-eighth inch has been found to be sufficient.

Sealing disk 40 and anti-friction washer 50 are loosely held in race 30 and may rotate independently of body 20. Anti-friction washer 50 separates sealing disk 40 from end wall internal surface 28.

The functioning of the above-identified elements and the improved method of construction and testing using the cap is best explained with reference to FIG. 3. During rough construction of a home, apartment, or other structure having sinks, or the like, the plumbing that is disposed in the framework is installed before the wall surfaces are put on. Vertical drain pipe 60 typically is disposed in the building framework, not shown. Pipe 60 is made of cast iron. Interposed in vertical drain pipe 60 is tap-T 62 including open end 64 which is internally threaded. This is the conventional configuration and environment in which one of the methods for leak testing discussed in the prior art section is used.

The use of Applicant's test cap allows all of the in-wall plumbing to be installed during rough. Finish wall line 70 represents the room-side termination of the wall to be constructed. The outer wall which covers the building framework would typically be wallboard, such as sheetrock. According to Applicant's construction method, the connection from drain pipe 60 is terminated during rough in a common trap adapter 80 which is generally centered near finish wall line 70.

Common trap adapter 80 includes first external threads 82 for threadable connection to tap-T 62 or to an extension pipe, not shown, and second external threads 82 for the later attachment of a sink trap. Preferably, trap adapter 80 is disposed so that approximately four threads protrude into the room past finish wall line 70. The sink trap and sink are attached much later, after the walls are covered. Integral hex nut 86 is used to turn and tighten trap adapter 80 without marring the threads. For purposes of test, trap adapter 80 may be sufficiently tightened by hand. Alternatively, a simple light tool, such as channel locks, may be used. At this point in construction, the drain system, terminates inside of the room to be constructed and presents external second threads 82 and end face 84 to cap 10. Cap 10 is now threadably attached to the drain system by threading it onto second threads 82 and hand tightening it.

As cap 10 is threaded onto trap adapter 80, sealing disk 40 encounters end face 84. The friction between end face 84 and sealing disk 40 is much greater than the torsional frictional forces transferred to sealing disk 40 from end wall internal surface 28 thru anti-friction washer 50. Therefore, once sealing disk 40 encounters end face 84, it does not rotate with the cap body 20, but only moves axially to form a perfect sealing fit over end face 84. Because sealing disk 40 does not rotate upon sealing; irregularities in end face 84 do not gouge channels in the disk that will leak. The disk thickness allows the disk 40 to seal against pipe end faces which are not cut perfectly perpendicular to the pipe's axis. If one side of sealing disk 40 wears, it can be easily turned over for further use. Also, sealing disk 40 is easily replaced at nominal cost. Preferably, the cap end face 23 will be flush with finish wall line 70 when cap 10 is attached to trap adapter 80.

The drain system can now be pressure tested for leaks. Plug 90 allows the drain system to be filled with water for test thru the pressure test cap. A hose nozzle or adapter attachment can be threaded into threaded bore 34 and the pipes can be filed until water comes out the upper vents or until sufficient head is otherwise arrived at to conduct the test. This eliminates the prior art practice climbing to the upper reaches of the drain system and inserting the water for test there.

Preferably, Cap 10 may be left in place during later construction, including placement of the wall coverings, to protect external threads 82 of trap adapter 80. Once the wall boards are in place, the cap can be removed for the finish plumbing operations, including attachment of traps and sinks.

From the foregoing description, it is seen that the pressure test cap and method of construction of the present invention provides a much less expensive and labor efficient manner of constructing drain systems and leak testing them. The most reliable prior art method involved installing the bulky and heavy test nipple and cap requiring tools and sealant and their later removal, also requiring large wrenches.

Although a particular embodiment of the invention has been illustrated an described; various changes may be made in the form, construction, and arrangement of the parts herein without sacrificing any of its advantages. Therefore, it is to be understood that all matter herein is to be interpreted as illustrative and not in any limiting sense, and it is intended to cover in the appended claims such modifications and changes as come within the true spirit and scope of the invention.

I claim:

1. A screw cap for sealing during leak testing the open end face of a pipe having an externally threaded end portion; said screw cap comprising:
   a body including:
     a cylindrical portion having internal threads for attachment to the externally threaded end portion of a pipe; and
     an end wall enclosing one end of said cylindrical portion and defining, with said cylindrical portion, a cavity; said end wall having a generally planar internal surface;
   a thick circular sealing disk disposed within said cavity and having a diameter sufficient to cover the open end face of an attached pipe; and
   an anti-friction washer disposed between said sealing disk and said internal surface of said end wall; such that said sealing disk can rotate independently of said body; such that as said body is threaded onto a pipe, said sealing disk does not rotate after encountering the pipe's open end face.

2. The screw cap of claim 1 including:
   retaining means for retaining said circular sealing disk and said anti-friction washer within said cavity.

3. The screw cap of claim 1 wherein said circular sealing disk is made of neoprene.

4. The screw cap of claim 1 wherein said anti-friction washer is made of polyvinylchloride.

5. The screw cap of claim 1 wherein said cap body is of tough, slightly resilient plastic.

6. A screw cap for sealing during leak testing the open end face of a pipe having an externally threaded end portion; said screw cap comprising:
   a body including:
     a cylindrical portion having internal threads for attachment to the externally threaded end portion of a pipe; and
     an end wall enclosing one end of said cylindrical portion and defining, with said cylindrical portion, a cavity; said end wall having a generally planar internal surface;
   hose coupling means thru said end wall for attaching a hose for injecting water into the attached pipe;
   a thick circular sealing ring disposed within said cavity and having a diameter sufficient to cover the open end face of an attached pipe; and
   an anti-friction washer ring disposed between said sealing disk and said internal surface of said end wall; such that said sealing disk can rotate independently of said body; such that as said body is threaded onto a pipe, said sealing ring does not rotate after encountering the pipe's open end face.

7. The screw cap of claim 6 wherein said hose coupling means includes:
   a threaded bore thru said end wall; and
   a threaded plug for said threaded bore.

8. The screw cap of claim 7 wherein said threaded plug includes:
   a threaded portion for insertion into said threaded bore;
   a flange portion larger than said bore; and
   a ring washer disposed around said threaded portion for sealing between said flange and the outside of said end wall.

9. A method of sealing an open end of a plumbing drain pipe for leak testing the pipe comprising the steps of:
   terminating the drain pipe in an open externally threaded end; and
   attaching a screw cap to said externally threaded end portion; said screw cap comprising:
   a body including:
     a cylindrical portion having internal threads for attachment to the externally threaded end portion of a pipe; and
     an end wall enclosing one end of said cylindrical portion and defining, with said cylindrical portion, a cavity; said end wall having a generally planar internal surface;
   a thick circular sealing disk disposed within said cavity and having a diameter sufficient to cover the open end face of an attached pipe; and
   an anti-friction washer disposed between said sealing disk and said internal surface of said end wall; such that said sealing disk can rotate independently of said body; such that as said body is threaded onto a pipe, said sealing disk does not rotate after encountering the pipe's open end face.

10. The method of claim 6 wherein the step of terminating the drain pipe in an externally threaded end includes the step of attaching a trap adapter to be the end of the drain pipe.

* * * * *